US012580897B2

(12) United States Patent
Paris, III

(10) Patent No.: US 12,580,897 B2
(45) Date of Patent: Mar. 17, 2026

(54) ANALYZING INDIVIDUAL INFORMATION FROM MULTI-DATABASE SYSTEM

(71) Applicant: Vigilytics LLC, Victor, NY (US)

(72) Inventor: Andrew L. Paris, III, Victor, NY (US)

(73) Assignee: Vigilytics LLC, Victor, NY (US)

( * ) Notice: Subject to any disclaimer, the term of this patent is extended or adjusted under 35 U.S.C. 154(b) by 0 days.

(21) Appl. No.: 19/094,557

(22) Filed: Mar. 28, 2025

(65) Prior Publication Data

US 2025/0310304 A1     Oct. 2, 2025

Related U.S. Application Data

(60) Provisional application No. 63/571,928, filed on Mar. 29, 2024.

(51) Int. Cl.
H04L 9/40     (2022.01)
G06F 21/62     (2013.01)

(52) U.S. Cl.
CPC ...... H04L 63/0421 (2013.01); G06F 21/6218 (2013.01)

(58) Field of Classification Search
CPC .......................... H04L 63/0421; G06F 21/6218
(Continued)

(56) References Cited

U.S. PATENT DOCUMENTS 8,578,176 B2    11/2013   Mattsson
9,118,641 B1 *   8/2015   Paris, III ................. H04L 63/08
(Continued)

FOREIGN PATENT DOCUMENTS

CN        116865993 A  * 10/2023   ......... H04L 63/0442
DE     102005002340 A1 *  7/2006   .......... H04L 9/0822
(Continued)

OTHER PUBLICATIONS

Al-Qudah, Zakaria, Eamon Johnson, Michael Rabinovich, and Oliver Spatscheck. "Internet with transient destination-controlled addressing." IEEE/ACM Transactions on Networking 24, No. 2 (2014): 731-744. (Year: 2014).*
(Continued)

*Primary Examiner* — Luu T Pham
*Assistant Examiner* — Walter J Malinowski
(74) *Attorney, Agent, or Firm* — Fish & Richardson P.C.

(57)     ABSTRACT

A computer-implemented method includes a request server receiving data representing identification data from an application server and assigning a transient token to the received identification data. The request server initiates transmission of the identification data and the assigned transient token to a de-identification server. The de-identification server generates a unique token from the identification data and initiates transmission of the generated unique token and the assigned transient token to a de-identified data server. The de-identified data server receives data representing sensitive information corresponding to the identification data and initiates transmission of the received sensitive information and the assigned transient token to an analytic server. The analytic server initiates transmission to the request server requested content attained from the received sensitive information and the transient token. The request server initiates transmission to the application server the attained requested content based on the transient token being received at the request server.

27 Claims, 13 Drawing Sheets

(58) Field of Classification Search
USPC .......................................................... 726/27
See application file for complete search history.

(56) References Cited

U.S. PATENT DOCUMENTS

| | | | |
|---|---|---|---|
| 9,323,892 B1 | 4/2016 | Paris, III | |
| 10,886,012 B1 | 1/2021 | Paris, III | |
| 11,004,548 B1 * | 5/2021 | Austin | H04L 9/3226 |
| 11,863,597 B1 * | 1/2024 | Gosztyla | H04L 65/1096 |
| 12,120,237 B1 | 10/2024 | Paris, III | |
| 2003/0009523 A1 * | 1/2003 | Lindskog | H04L 63/04 |
| | | | 709/205 |
| 2004/0078336 A1 * | 4/2004 | Asadu | H04N 21/2541 |
| | | | 713/168 |
| 2009/0249082 A1 | 10/2009 | Mattsson | |
| 2012/0173563 A1 * | 7/2012 | Griffin | G06F 21/6245 |
| | | | 707/769 |
| 2012/0266231 A1 * | 10/2012 | Spiers | G06F 9/45533 |
| | | | 726/12 |
| 2014/0146954 A1 * | 5/2014 | Noldus | H04L 65/1104 |
| | | | 379/114.01 |
| 2014/0359709 A1 * | 12/2014 | Nassar | H04L 65/1083 |
| | | | 726/4 |
| 2014/0372544 A1 * | 12/2014 | Wen | H04L 51/046 |
| | | | 709/206 |
| 2016/0165306 A1 * | 6/2016 | Nam | H04N 21/4758 |
| | | | 725/14 |
| 2016/0182231 A1 | 6/2016 | Fontecchio | |
| 2017/0132431 A1 * | 5/2017 | Gonzalez Blanco | |
| | | | H04L 63/0838 |
| 2018/0082082 A1 * | 3/2018 | Lowenberg | G06F 21/602 |
| 2020/0273079 A1 * | 8/2020 | Raviv | G06Q 30/0631 |
| 2020/0286015 A1 * | 9/2020 | Richards | H04L 61/4511 |
| 2020/0329015 A1 * | 10/2020 | Itzkovich | H04L 63/0209 |
| 2021/0149862 A1 * | 5/2021 | Bernard | G06F 21/6218 |
| 2021/0182428 A1 * | 6/2021 | Paris, III | G16H 10/40 |
| 2022/0076334 A1 * | 3/2022 | Filter | G06Q 20/1235 |
| 2022/0156177 A1 * | 5/2022 | Levacher | G06F 11/3692 |
| 2023/0208837 A1 | 6/2023 | Tulshibagwale et al. | |
| 2023/0216679 A1 | 7/2023 | Tomar | |
| 2023/0239324 A1 * | 7/2023 | Shetty | H04L 63/0807 |
| | | | 713/151 |
| 2023/0260614 A1 * | 8/2023 | Kromelow | G16H 50/20 |
| | | | 705/2 |
| 2024/0420073 A1 * | 12/2024 | Drew | G06Q 10/0833 |
| 2025/0047660 A1 * | 2/2025 | Piperakis | H04L 63/0807 |

FOREIGN PATENT DOCUMENTS

| | | | | |
|---|---|---|---|---|
| EP | 4432712 A1 * | 9/2024 | | H04L 9/3213 |
| JP | 2008312172 A * | 12/2008 | | |
| WO | WO-2017161403 A1 * | 9/2017 | | |
| WO | WO-2023043807 A1 * | 3/2023 | | H04L 9/3268 |

OTHER PUBLICATIONS

Butler, Kevin RB, Sunam Ryu, Patrick Traynor, and Patrick D. McDaniel. "Leveraging identity-based cryptography for node id assignment in structured p2p systems." IEEE Transactions on Parallel and Distributed Systems 20, No. 12 (2008): 1803-1815. (Year: 2008).*

Fotiou, Nikos, Apostolis Machas, George C. Polyzos, and George Xylomenos. "Access control delegation for the cloud." In 2014 IEEE Conference on Computer Communications Workshops (INFOCOM WKSHPS), pp. 13-18. IEEE, 2014. (Year: 2014).* eur-lex.europa.eu [online], "Regulation (EU) 2016/679 of the European Parliament and of the Council (on the protection of natural persons with regard to the processing of personal data and on the free movement of such data, and repealing Directive 95/46/EC (General Data Protection Regulation))," Apr. 27, 2016, retrieved on May 10, 2024, retrieved from URL<https://eur-lex.europa.eu/legal-content/EN/TXT/PDF/?uri=CELEX:32016R0679>, 88 pages.

gdpr-info.eu/ [online], "General Data Protection Regulation GDPR," May 25, 2018, retrieved on May 10, 2024, retrieved from URL<https://gdpr-info.eu/>, 7 pages.

International Search Report and Written Opinion in International Appln. No. PCT/US2025/022155, mailed on Jun. 18, 2025, 8 pages.

* cited by examiner

550

552

570

Synthetic Data Generator

568

Data Loader

560

558

Token(s),
Sensitive
Information,
Synthetic Data

De-identified Data Server

562 Synthetic
Data Server

556

Token &
Sensitive
Information

558

De-identification
Server

557

Token
Generator

Receive, at a request server, data representing user credentials from an application server.
802

Assign a transient token to the received user credentials and initiate transmission of the user credentials and the assigned transient token to a de-identification server.
804

Generate, at the de-identification server, a unique token from the user credentials received from the request server, and initiates transmission of the generated unique token and the assigned transient token to a de-identified data server.
806

Receive, at the de-identified data server, data representing sensitive information corresponding to the use credential based on matching the generated unique token and a token corresponding to the user credentials of the sensitive information stored at the de-identified data server, and initiates transmission of the received sensitive information and the assigned transient token to an analytic server.
808

Initiate transmission, at the analytic server, to the request server requested content attained from the received personal information and the transient token.
810

Initiate transmission, at the request server, to the application server the attained requested content based on the transient token being received at the request server.
812

900
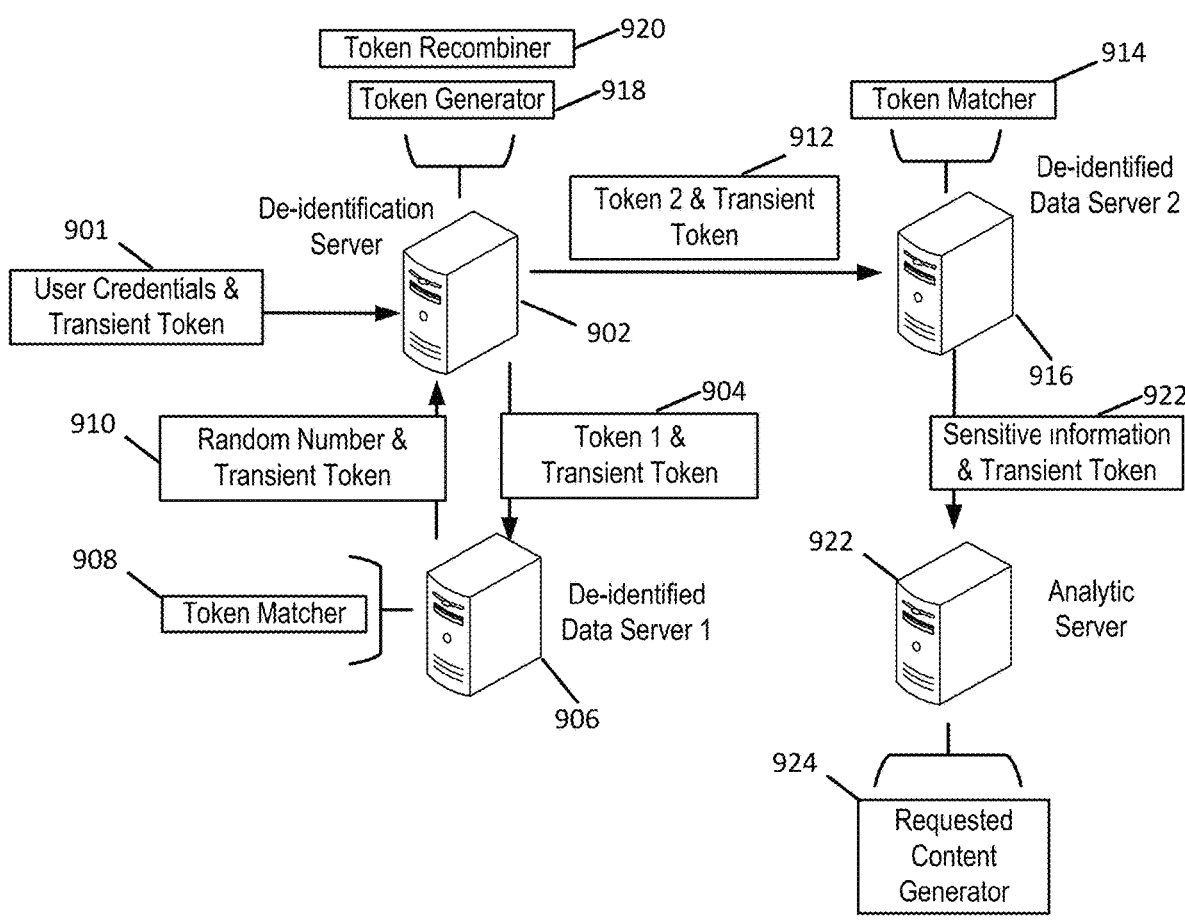
FIG. 9

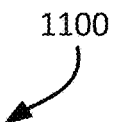
1100

Receive, at a first de-identified data server, data representing a random number based on matching the generated unique token and a token corresponding to the user credentials at the first de-identified data server, and initiate transmission of the received random number and the assigned transient token to the de-identification server.
1102

Generate, at the de-identification server, a second unique token from the received random number received from the first de-identified data server, and initiate transmission of the generated second unique token and the assigned transient token to a second de-identified data server.
1104

Receive, at the second de-identified data server, data representing sensitive information corresponding to the user credentials based on matching the generated second unique token and a token stored at the second de-identified data server, and initiate transmission of the received sensitive information and the assigned transient token to the analytic server.
1106

FIG. 11

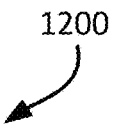

1200

Receive, at a second request server, data representing user credentials from the application server.
1202

↓

Receive, at the second request server, a second set of requested content attained from sensitive information, in which the second set of requested content is different from the requested content received by the request server from the analytic server.
1204

↓

Generate a combined set of requested content that includes the requested content and the second set of requested content.
1206

↓

Initiate transmission of the combined set of requested content to the application server.
1208

FIG. 12

ANALYZING INDIVIDUAL INFORMATION FROM MULTI-DATABASE SYSTEM

CLAIM OF PRIORITY

This application claims priority under 35 USC § 119(e) to U.S. Provisional Patent Application Ser. No. 63/571,928, filed on Mar. 29, 2024, the entire contents of which are hereby incorporated by reference.

BACKGROUND

In the era of large scale data processing of user data, particularly within the context of social media platforms, the collection, storage, and analysis of sensitive information are important aspects of delivering personalized content experiences. These platforms accumulate vast quantities of user data, encompassing personal preferences, interactions, and other forms of identifiable information. The importance of safeguarding this data against unauthorized access and misuse is critical, especially in light of increasing concerns about privacy and data security.

SUMMARY

The systems and techniques described here relate to storing, accessing, and analyzing personal and/or sensitive information associated with a user of a digital platform.

The subject matter described in this specification can be implemented in particular embodiments to realize one or more of the following advantages. Techniques are described for accessing sensitive information and analyses based on sensitive information associated with a user of a digital platform, such as a social media website. In addition, the described techniques are applicable to storing and accessing sensitive information related to an entity other than a user of a digital platform (e.g., a company). The digital platform can collect sensitive information related to online activity and other aspects associated with the user. In addition, the system can collect the sensitive information via other channels including file uploads, access to databases, among others. In some cases, it can access the sensitive information later without storing the sensitive information in a database that is managed by an entity associated with the digital platform or an entity associated with the sensitive information. In some implementations, the sensitive information is personal information related to a particular individual. In some other implementations, the sensitive information is related to a particular organization or entity. The techniques described here include storing a de-identified version of the sensitive information and accepting requests from the digital platform or other computing resource (e.g., server, terminal, etc.) for an analysis of the de-identified sensitive information. A transient token that is assigned to each request can be used to match each request with a particular output from the third party service without revealing an identity of an associated individual or secrets associated with the sensitive information.

Furthermore, the system generates tokens based on the sensitive information received from a user or entity in computer memory, without implementing a token vault. This feature allows for additional security by avoiding crosswalk (a mapping of tokens to a reference table or database), reducing a likelihood of a breach of an entire de-identified database.

In a general sense, the techniques described in the present disclosure relate to collecting, storing, and generating analyses of sensitive information. The sensitive information can be related to a particular individual (e.g., a user of a digital platform) or to a particular entity or organization (e.g., a company or state entity). In some cases, the descriptions herein relate to a digital platform (e.g., a social media website) that collects the sensitive information and requests data derived from the personal information. However, the systems and techniques are applicable to a wider range of application including collecting, storing, and generating analyses of organizational sensitive information not related to a particular individual. In these applications, the system can store and access sensitive information about an organization or an entity based on identification data related to the organization or entity.

In one aspect, a computing device implemented method includes receiving, at a request server, data representing identification data (e.g., user credentials like a username, email, password, entity name, bar code, biometrics, etc., or a combination of multiple data fields) from an application server. The method includes the request server assigning a transient token to the received identification data and initiating transmission of the identification data and the assigned transient token to a de-identification server. The de-identification server generates a unique token from the identification data received from the request server, and initiates transmission of the generated unique token and the assigned transient token to a de-identified data server. The de-identified data server receives data representing sensitive information corresponding to the identification data based on matching the generated unique token and a token corresponding to the identification data of the sensitive information stored at the de-identified data server, and initiates transmission of the received sensitive information and the assigned transient token to an analytic server. The analytic server initiates transmission to the request server the transient token and requested content attained from the received sensitive information. The request server initiates transmission to the application server the attained requested content based on the transient token being received at the request server.

Implementations may include any or all of the following features. The received sensitive information and the assigned transient token is transmitted to the analytics server absent the generated unique token. The de-identified data server deletes the generated unique token. The transient token is returned for reuse. The transient token is assignable to other received identification data. The analytic server processes the received sensitive information to produce the attained requested content. The attained requested content includes one or more links to information for an entity associated with the identification data. Transmission of the attained requested content to the application server may be initiated upon matching the transient token received from the analytic server to the transient token transmitted to the de-identification server. The de-identified data server stores sensitive information corresponding to one or more synthetic entities.

In some implementations, the method includes receiving, at another de-identified data server, data representing a random number based on matching the generated unique token and a token corresponding to the identification data at the other de-identified data server, and initiating transmission of the received random number and the assigned transient token to the de-identification server, generating, at the de-identification server, another unique token from the received random number received from the other de-identified data server, and initiating transmission of the generated other unique token and the assigned transient token to an additional de-identified data server, and receiving, at the additional de-identified data server, data representing sensitive information corresponding to the identification data based on matching the generated other unique token and a token stored at the additional de-identified data server, and initiating transmission of the received sensitive information and the assigned transient token to the analytic server. In some implementations, the other de-identified data server is separate from the additional de-identified data server.

In another aspect, a system includes a request server for receiving data representing identification data from an application server and assigning a transient token to the received identification data and initiating transmission of the identification data and the assigned transient token. The system also includes a de-identification server for receiving the identification data and the assigned transient token from the request server and generating a unique token from the identification data received from the request server and initiating transmission of the generated unique token and the assigned transient token. The system also includes a de-identified data server for receiving the generated unique token and the assigned transient token from the de-identification server and receiving data representing sensitive information corresponding to the identification data based on matching the generated unique token and a token corresponding to the identification data of the sensitive information stored at the de-identified data server, and initiating transmission of the received sensitive information and the assigned transient token. The system also includes an analytic server for receiving the sensitive information and the assigned transient token from the de-identified data server and initiating transmission to the request server, the transient token and requested content attained from the received sensitive information, the request server initiating transmission to the application server the attained requested content based on the transient token being received at the request server.

Implementations may include any or all of the following features. The received sensitive information and the assigned transient token is transmitted to the analytic server absent the generated unique token. The de-identified data server deletes the generated unique token. The transient token is returned for reuse. The transient token is assignable to other received identification data. The analytic server processes the received sensitive information to produce the attained requested content. The attained requested content comprises one or more links to information for an entity associated with the identification data. Transmission of the attained requested content to the application server is initiated upon matching the transient token received from the analytic server to the transient token transmitted to the de-identification server. The de-identified data server stores sensitive information corresponding to one or more synthetic entities.

In some implementations, the system includes another de-identified data server for receiving data representing a random number based on matching the generated unique token and a token corresponding to the identification data at the other de-identified data server, and initiating transmission of the received random number and the assigned transient token to the de-identification server, wherein the de-identification server is configured to generate another unique token from the received random number and initiate transmission of the generated other unique token and the assigned transient token, and an additional de-identified data server for receiving the other unique token and the assigned transient token from the de-identification server, wherein the additional de-identification server is configured to receive sensitive information corresponding to the identification data based on matching the generated additional unique token and a token stored at the additional de-identified data server, and initiating transmission of the received sensitive information and the assigned transient token to the analytic server. In some implementations, the other de-identified data server is separate from the additional de-identified data server.

In some implementations, the system includes another request server for (i) receiving data representing the identification data from the application server, (ii) receiving an additional set of requested content attained from sensitive information, wherein the additional set of requested content is different from the requested content received by the request server from the analytic server, (iii) generating a combined set of requested content comprising the requested content and the additional set of requested content, and (iv) initiating transmission of the combined set of requested content to the application server.

In another aspect, one or more computer readable storage devices storing instructions that are executable by a processing device, and upon such execution cause the processing device to perform operations including receiving, at a request server, data representing identification data from an application server and assigning a transient token to the received identification data and initiating transmission of the identification data and the assigned transient token to a de-identification server. The operations include generating, at the de-identification server, a unique token from the identification data received from the request server and initiating transmission of the generated unique token and the assigned transient token to a de-identified data server. The operations include receiving, at the de-identified data server, data representing sensitive information corresponding to the identification data based on matching the generated unique token and a token corresponding to the identification data of the sensitive information stored at the de-identified data server and initiating transmission of the received sensitive information and the assigned transient token to an analytic server. The operations include initiating transmission, at the analytic server, to the request server the transient token and requested content attained from the received sensitive information. The operations include initiating transmission, at the request server, to the application server the attained requested content based on the transient token being received at the request server.

Implementations may include any or all of the following features. The received sensitive information and the assigned transient token is transmitted to the analytic server absent the generated unique token. The de-identified data server deletes the generated unique token. The transient token is returned for reuse. The transient token is assignable to other received identification data. The analytic server processes the received sensitive information to produce the attained requested content. The attained requested content comprises one or more links to information for an entity associated with the identification data. Transmission of the attained requested content to the application server is initiated upon matching the transient token received from the analytic server to the transient token transmitted to the de-identification server. The de-identified data server stores sensitive information corresponding to one or more synthetic entities.

In some implementations, the operations include receiving, at another de-identified data server, data representing a random number based on matching the generated unique token and a token corresponding to the identification data at the other de-identified data server, and initiating transmission of the received random number and the assigned transient token to the de-identification server, generating, at the de-identification server, another unique token from the received random number received from the other de-identified data server, and initiating transmission of the generated other unique token and the assigned transient token to an additional de-identified data server, and receiving, at the additional de-identified data server, data representing sensitive information corresponding to the identification data based on matching the generated other unique token and a token stored at the additional de-identified data server, and initiating transmission of the received sensitive information and the assigned transient token to the analytic server. In some implementations, the other de-identified data server is separate from the additional de-identified data server.

In some implementations, the operations include receiving, at another request server, data representing identification data from the application server, receiving, at the other request server, an additional set of requested content attained from sensitive information, wherein the additional set of requested content is different from the requested content received by the request server from the analytic server, generating a combined set of requested content comprising the requested content and the additional requested content, and initiating transmission of the combined set of requested content to the application server.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 8 is a flowchart that represents operations of a system of servers.

FIG. 9 illustrates a system diagram that graphically illustrates generating nested tokens.

FIG. 11 is a flowchart that represents operations of a system of servers.

FIG. 12 is a flowchart that represents operations of a system of servers.

Like reference numbers and designations in the various drawings indicate like elements.

DETAILED DESCRIPTION

The General Data Protection Regulation (GDPR) serves as a cornerstone in the legal framework governing data protection in the European Union. It imposes strict requirements on data controllers and processors, emphasizing the principles of data minimization, purpose limitation, and the necessity of ensuring data accuracy and security. One of the critical aspects of GDPR is the emphasis on the de-identification of sensitive information, which involves processing data to remove or obscure personal identifiers so that the data subject can no longer be directly or indirectly identified.

Figure 1:
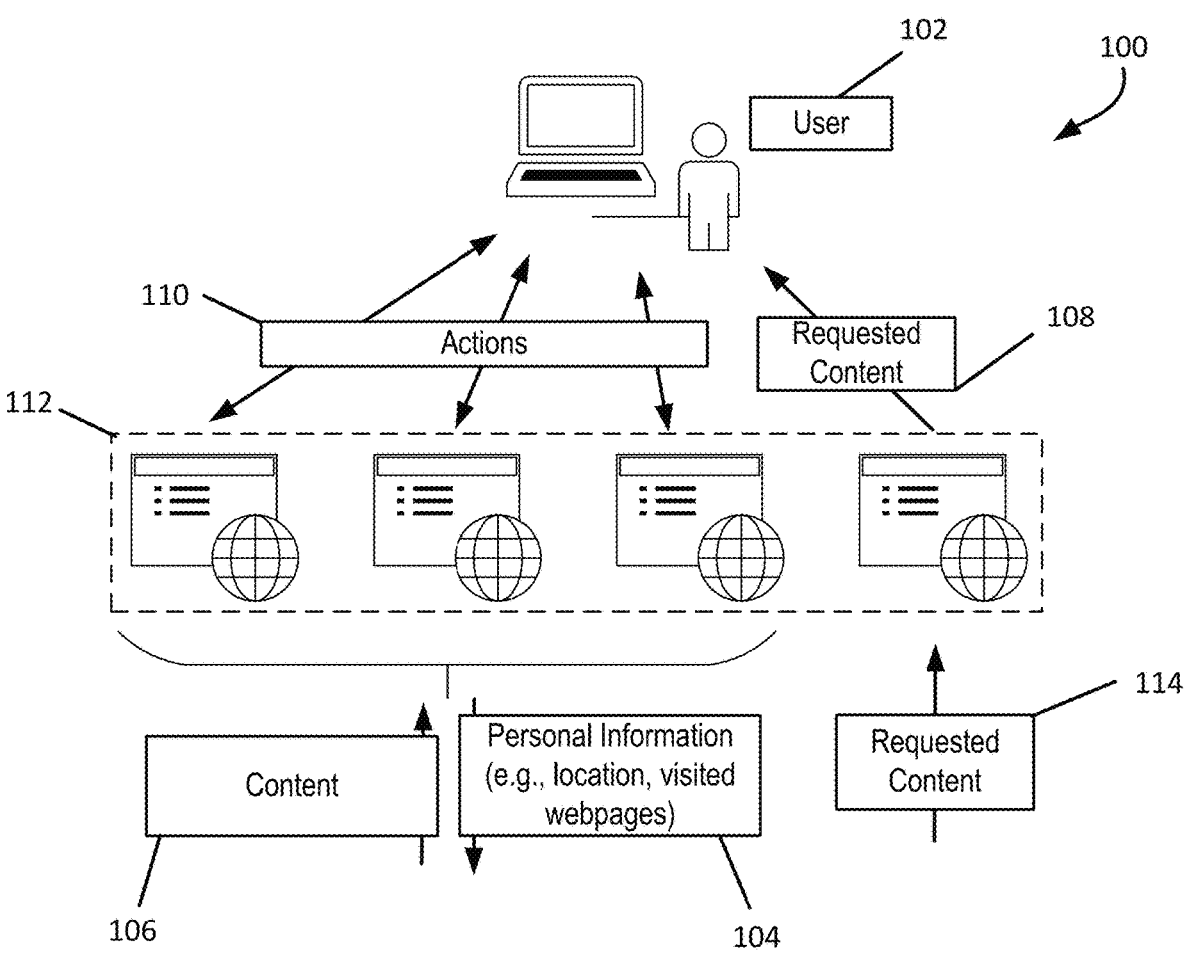
FIG. 1 illustrates an environment that graphically represents circumstances in which sensitive information of a user is collected by one or more digital platforms and used to provide requested content to the user.

FIG. 1 illustrates an environment 100 that graphically represents circumstances in which sensitive information 104 of a user 102 is collected by one or more digital platforms and used to provide requested content to the user. When the user 102 performs actions while interacting with a digital platform 112, e.g., website or social media app, the user 102 leaves a trail of sensitive information 104 that can be collected, stored, and used by the digital platform 112 to deliver a personalized experience. In some implementations, the user 102 interacts with content 106 served by the digital platform 112 to the user 102. For example, actions 110 performed by the user 102 may include watching a video, interacting with another user, clicking a link, sharing a piece of content for other users to view, etc. In some cases, the personalized experience may include the digital platform 112 delivering requested content 108 that is relevant to the interests of the user 102, for example, delivering advertisements that the user 102 may be more likely to click. The digital platform 112 receives requested content 114 to deliver to the user 102 based on the sensitive information 104 collected by the digital platform 112.

The embodiment described in relation to FIG. 1 is related to a particular use case of a digital platform collecting and storing sensitive information related to the user 102. Other embodiments include entities other than individual users (e.g., a company, organization, or other entity) that are associated with the sensitive information. Furthermore, the present embodiment relates to collecting sensitive information associated with usage of a digital platform. This can be extended for additional embodiments that relate to other types of sensitive information (e.g., medical information, banking information, and other secret/sensitive information). In some cases, the user 102 is an individual associated with the sensitive information. In some other cases, the user 102 is an entity that is collecting the sensitive information and requesting particular analytical insights related to the sensitive information, in which the entity has authorization to access the sensitive information or analytical insights derived from the sensitive information.

The personalized experience may benefit both parties (e.g., the user 102 and the digital platform 112). For example, the personalized experience can benefit the user 102 if the user 102 receives interesting, requested content 108 and advertisements for products and services the user 102 wants. Similarly, the personalized experience can benefit the digital platform 112 if the digital platform 112 generates more revenue due to more relevant advertisement placements and increases in engagement and time-on-platform due to more requested content 108 which can lead to higher demand for advertising.

As the user 102 performs the actions 110 while interacting with the digital platform 112, the digital platform 112 can collect, store, and analyze data representing these actions 110, where the digital platform 112 can interpret the actions 110 as a set of sensitive information 104. The sensitive information 104 can correlate with particular habits, preferences, hobbies, political affiliations, etc., about the user 102. For example, if the user 102 watches more than half of a thirty-minute video on how to kick a soccer ball, it can be inferred that the user 102 has some interest in soccer and is perhaps learning to play the game. The digital platform 112 can use this information to determine requested content 108 to the user 102 and deliver relevant advertisements that might be of interest to the user 102.

In some jurisdictions, regulations limit how a data controller, e.g., a digital platform, or any entity that has access to sensitive information related to a particular individual, etc., can collect, store, manage, and analyze sensitive information. This includes information such as name, email address, location identifiers, online identifiers, IP addresses, and physical characteristics. For example, the European General Data Protection Regulation (GDPR) limits the manner in which the sensitive information can be collected and stored. For example, according to GDPR, the data controller can only store personally identifying data for as long as necessary for the specified purpose. In addition, the data controller must explicitly ask the user for permission to collect and store sensitive information and must clearly explain how they intend to use the sensitive information. Similarly, the data controller typically must store the sensitive information in a manner that makes each piece of sensitive information easy to find, recover, change, and delete. The data controller also typically must store the sensitive information in an encrypted database and in a format that can be easily shared and understood by other parties.

Figure 2:
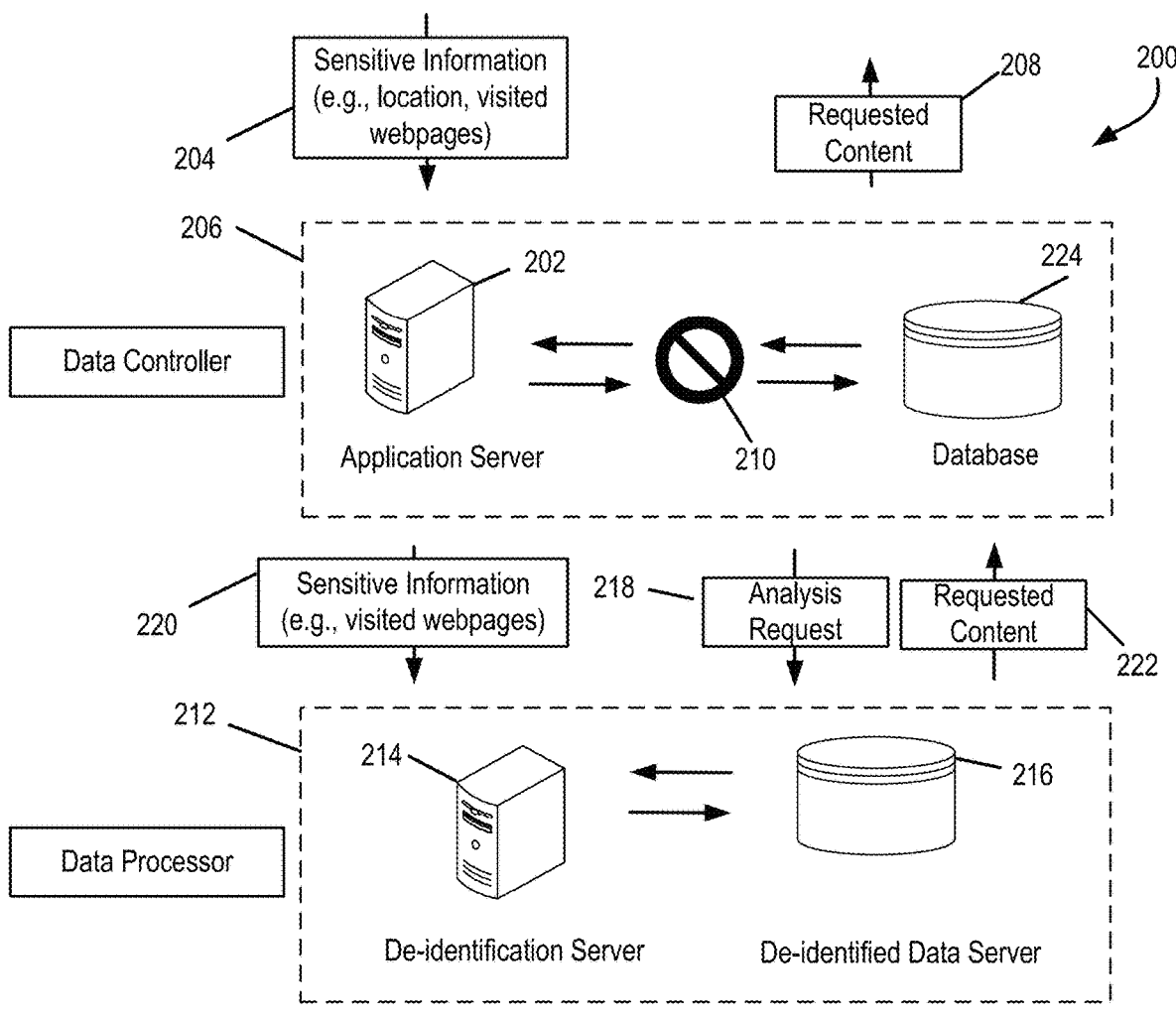
FIG. 2 illustrates graphical representations of exemplary circumstances in which a digital platform collects and stores sensitive information of a user.

FIG. 2 illustrates graphical representations of exemplary circumstances 200 in which a digital platform (e.g., digital platform 112 of FIG. 1), collects and stores sensitive information 204 of a user (e.g., such as the user 102 of FIG. 1). A data controller 206, e.g., a digital platform (e.g., provided by one or more servers, databases, etc.), can collect sensitive information 204 related to a user (e.g., sensitive information 104 of FIG. 1), where the sensitive information 204 can be collected in the form of actions taken by the user while interacting with the digital platform. In some cases, the sensitive information 204 can include product preferences, hobbies and interests, age, gender, location, and other personal characteristics determined by the actions taken by the user and information provided by the user to the one or one or more servers or databases that perform the operations of the digital platform.

As previously described in relation to GDPR, in some jurisdictions, regulations can limit how the data controller 206, e.g., a digital platform (e.g., provided by the one or more servers, databases, etc.) or any entity that has access to the sensitive information 204 related to a particular user, can collect, store, manage, and analyze the sensitive information 204. In some cases, the data controller 206 may prefer to delegate the responsibility of storing, managing, and analyzing sensitive information to a third party data processor 212. For example, the data controller 206 may reduce the risk of security breach of a database or a server that stores personally identifiable information (e.g., name, address, email address, social security number, etc.) along with the sensitive information 204 derived from a user's actions on a digital platform. Alternatively, a user may not trust a particular data controller (e.g., a digital platform) to store their sensitive information securely, so the data controller 206 may delegate this operation to a trusted third party data processor 212 to gain trust with a particular group of users. In addition, in some cases, a rogue employee associated with the data controller 206 may choose to access the sensitive information 204 without permission, which can be a breach of trust between the user and the data controller 206 that can be mitigated with the use of a trusted third party data processor 212. As another example, the data controller 206 may need to demonstrate a provably secure system for storing, accessing, and analyzing sensitive information to satisfy the requirements of particular regulatory frameworks. In some cases, this can be facilitated by delegating the storage, access, and analysis to a trusted and provably secure third party data processor (e.g., the third party data processor 212).

In some cases, the cost and expertise required to comply with requirements (e.g., GDPR requirements) are significant and primarily large companies are able to process sensitive information for the purpose of delivering personalized experiences. In all of these cases, the data controller 204 may not want to store sensitive information 204 that is collected by an application server 202 and stored in a database 224 that is managed by the data controller 206 (indicated by a restricted path 210) but may still want to offer personalized experiences to users based on the sensitive information 204.

The data processor 212, or a group of data processors, can be used to store, manage, and analyze sensitive information. In a single instance of the data processor 212 acting on behalf of the data controller 206 (e.g., a particular digital platform), the data controller 206 is simply responsible for collecting the sensitive information 204 (e.g., click streams or video views) and serving relevant, requested content 208 to users. The data processor 212 can receive sensitive information 220 related to a particular user, de-identify the data on a de-identification server 214, and securely store the data in a de-identified data server 216. The data controller 206 does not have access to the full set of sensitive information (e.g., sensitive information 204), since it is passing the sensitive information 220 to the data processor 212 without storing a copy. The data processor 212 accepts an analysis request 218 from the data controller 206, matches the analysis request 218 to the database hosted on the de-identified data server 216, and extracting the relevant sensitive information (e.g., sensitive information 220). In some implementations, the data processor 212 can deliver an analysis, insight, or elements that make up a personalized experience or requested content 222 (e.g., the requested content 108 of FIG. 1) to the data controller 206 to pass along to the particular user. In some other implementations, the data processor 212 can pass the data retrieved from the de-identified data server 216 to one or more computational devices, platforms, etc. such as an analytics server or service that can process the de-identified sensitive information to deliver a particular analysis, outcome, or requested content 208.

Figure 3:
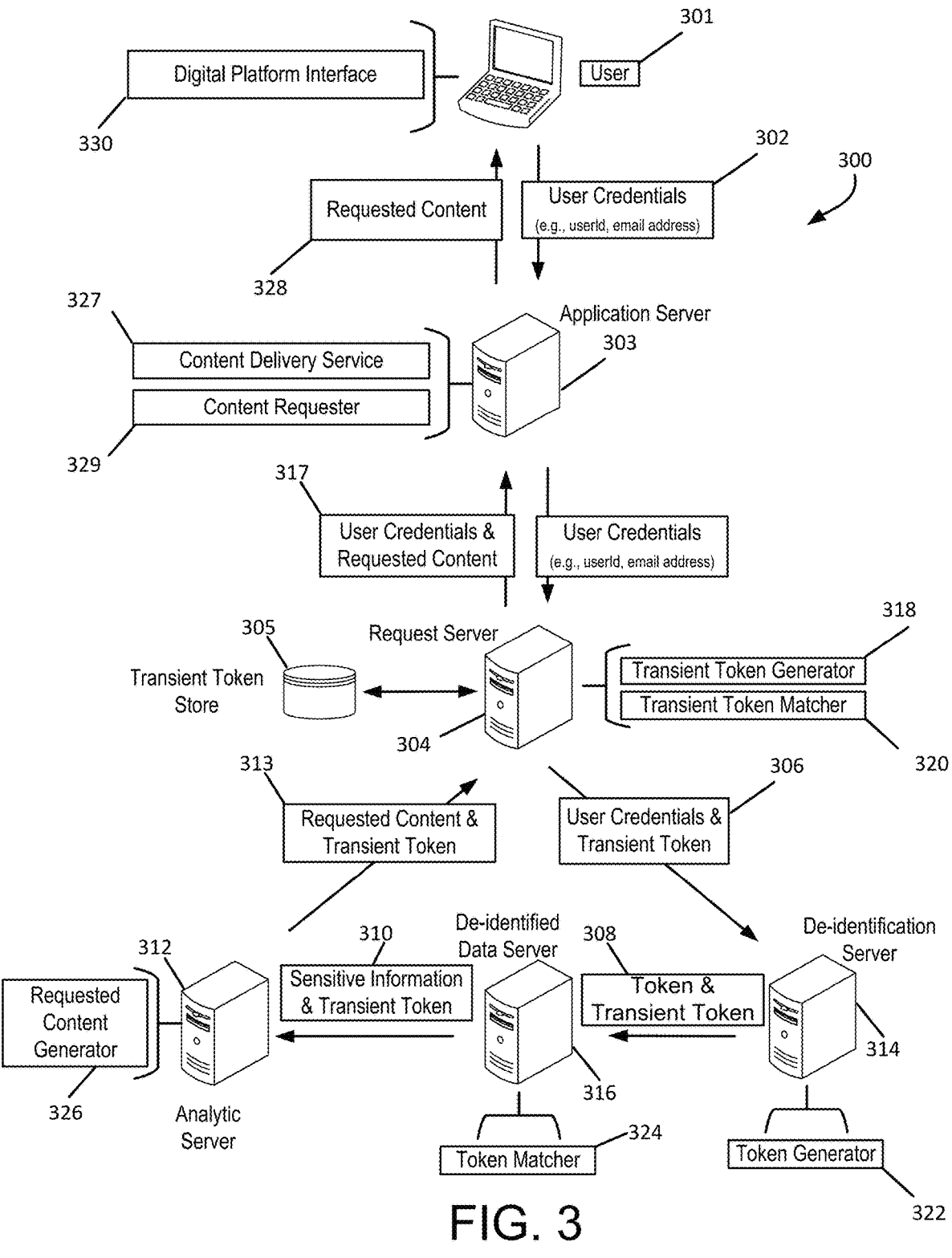
FIG. 3 illustrates graphical representations of exemplary circumstances in which an analysis of sensitive information is provided to an application server to provide to a user.

FIG. 3 illustrates graphical representations of exemplary circumstances 300 in which an analysis of sensitive information is provided to an application server 303 to provide to a user 301, where a user device implements instructions according to a digital platform interface 330. The user 301 provides identification data 302 (e.g., credentials) or other personally identifiable information to the application server 303 (e.g., the application server 202 of FIG. 2). In some cases, the application server 303 is managed by a data controller (e.g., data controller 206), where the data controller can be a digital platform like a social media website, etc. In some cases, the application server 303 relies on one or more data processors (e.g., data processor 212) to store, manage, and analyze sensitive information in relation to the user 301. In this example, the data controller can request a particular analysis or requested content to deliver to the user 301 based on the particular characteristics of the sensitive information previously collected by the data controller and stored by the data processor.

The application server 303 executes a content delivery service 327 to serve content to the user 301 and controls other aspects of the digital experience, e.g., user-user interactions, social feedback, advertisements, user generated content, in relation to the user 301. In some cases, the application server 303 (e.g., a server associated with the data controller 206) can request an analysis of the sensitive information stored in a third party data processor (e.g., data processor 212) in relation to the user 301. In some other cases, the application server 303 can request an analysis of the sensitive information stored in a database associated with the application server 303 (e.g., on the same cloud infrastructure, on the same server, or on any server or computer associated with the application server 303). In this case, the associated database can have particular access controls to restrict access to sensitive information by potential bad actors.

The application server 303 executes a content requester 329 that issues a request to a request server 304, where the request includes information such as the details of the requested analysis and the identification data 302 corresponding to the user 301. The request server 304 can be considered an intermediary between the application server 303 and the one or more data processors (e.g., data processor 212). In this arrangement, the request server 304 generates a transient token by executing a transient token generator 318, where the transient token is selected from a transient token store 305 (e.g., a transient token bank). In some implementations, the transient token store 305 includes a finite number of transient tokens In some other implementations, a transient token is generated in real-time based on an output from a random number generator that generates a random number from a finite range of numbers. In this case, the generated transient token is matched against a ledger of transient tokens currently in use for concurrent requests. If the generated transient token is in use, a second transient token is generated based on an output from the random number generator, and so on. Real time generation of transient tokens requires less storage than selecting a transient token from the token store 305. In some other implementations, a transient token is generated in real-time based on an output from a random number generator that generates a random number from an infinite range of numbers. The transient token is an identifier that relates to the request issued by the application server 303 to the request server 304. Each request is associated with a transient token retrieved from the transient token store 305. For example, the transient token generator 318 can generate the transient token using a random probability distribution. Alternatively, the transient token generator 318 can generate the transient token using any other probability distribution (e.g., uniform distribution) or method of selection or generation.

In some implementations, the transient token is generated by a random number generator. In some other implementations, an index corresponding to a transient token of the transient token store 305 is generated by a random number generator.

In some implementations, a remote server in relation to the request server 304 implements the token generator 318. In some implementations, a remote server or database server in relation to the request server 304 stores the transient token store 305. The one or more remote servers in relation to the request sever 304 can provide the generated or retrieved transient token to the request server 304.

In some implementations, the transient token is not unique to a single user, but is unique to a single request among one or more concurrent requests that are actively processed by one or more servers of the system, where the request is a request for requested content, analysis based on the sensitive information of the user 301, etc. In some arrangements, the same transient token can be reused for more than one user at different points in time. For example, a transient token can be returned to the transient token store 305 when operations are completed for one user, and the returned transient token can be used for a request from another user. This ensures that a single transient token cannot be reliably associated with a single user. In addition, the use of the transient token store 305 can result in increased processing speeds based on previously generated transient tokens.

The request server 304 passes the identification data and the transient token 306 to a de-identification server 314 (e.g., the de-identification service 214 of FIG. 2). In some implementations, the de-identification server 314 is a trusted third party and acts as a data processor, performing data operations on sensitive information in accordance with a set of instructions provided by the data controller. In some implementations, a token generator 322 executed by the de-identification server 314 generates a unique token, or identifier, based on the credentials provided by the user. For example, the token generator 322 can implement a hashing function that generates a fixed-size string of characters regardless of the size of the input. As another example, the token generator 322 can implement a tokenization process that replaces sensitive information with non-sensitive substitutes, where the non-sensitive substitutes are randomly generated and have no meaningful relationship with the original sensitive information. As another example, the token generator 322 can implement cryptographic pseudonymization that transforms sensitive information in a way that it cannot be attributed to a specific user without the use of additional information stored separately. This technique is generally implemented through encryption and requires a cryptographic key to access the original sensitive information.

In some implementations, the de-identification server 314 executes a token generator 322 which generates a token that irreversibly de-identifies a particular set of sensitive information. For example, the token generator 322 can execute operations that strips and deletes personally identifiable information from the set of sensitive information. In this case, the personally identifiable information is not recoverable. In some other implementations, the de-identification server 314 executes a token generator 322 which generates a token that reversibly de-identifies a particular set of sensitive information. For example, in some cases, a cryptographic key can be used to reverse a cryptographic transformation of sensitive information.

The de-identification server 314 passes the token and the transient token 308 corresponding to the de-identified identification data to a de-identified data server 316. The de-identified data server 316 stores the sensitive information of each user and is indexed by tokens, where the tokens are created by a similar de-identification process as described previously in relation to the de-identification server 314. A token matcher 324 (e.g., look up operations) executed by the de-identified data server 316 matches the token received by the de-identification server 314 to token associated with the records stored in the de-identified database. In some implementations, the de-identification process performed by the token matcher 324 is similar or identical to the de-identification process performed by the token generator 322. In some implementations, the de-identification server 314 can retrieve all of the sensitive information related to the user 301. In some other implementations, it can retrieve a portion of the sensitive information related to the user 301 as defined by the parameters of a request issued by the data controller.

The de-identified data server 316 deletes the token generated by the de-identification server 314 as soon as it retrieves the related database entry corresponding to the relevant sensitive information. The deleted token by the de-identified data server 316 ensures the token is not provided to a server or a privacy-segmented resource of a server that does not require the token to perform its associated operation. In addition, the deletion ensures that no sensitive information is stored unnecessarily. The de-identified data server 316 passes the sensitive information and the transient token 310 to an analytic server 312 absent the unique token generated by the de-identification server 314.

In some implementations, a requested content generator 326 executed on the analytic server 312 processes and executes specific instructions on behalf of the data controller to derive a particular output to be sent back to the data controller. The particular output is personalized to a particular user without revealing any personally identifiable information about the particular user. For example, the data controller may request to send a relevant advertisement to the user 301 based on recent searches on the digital platform operated by the servers and database associated with the data controller. The analytic server 312 can provide a link to relevant advertisement that has a predicted high probability of conversion based on the sensitive information stored in the de-identified data server 316. The requested content generator 326 can produce requested content that includes one or more links to information for a user associated with the identification data (e.g., the user 301 associated with the identification data 302).

In some implementations, the analytic server 312 is operated by a third party analytics service. In some other implementations, the analytic server 312 is operated by a controller (e.g., a digital platform corresponding to an application server 303) or a processor (e.g., a de-identification server) with appropriate firewalls and security measures in place to ensure appropriate separation between sensitive information related to a particular user or entity and requested content or other analytics outputs.

In some implementations, the requested content is personalized content related to a particular user and associated actions on a digital platform (e.g., a social media website). In some other implementations, the requested content includes data records or subsets of data records that meet an intended purpose of a particular analytic server. For example, the analytic server 312 can generate an analytical output based on processing sensitive information that includes an amount of detail linked to a level of authorization of a requesting party (e.g., an individual that makes a request or submits the identification data 302 to the application server 303). In some other implementations, the requested content generated by the analytic server 312 includes information about banking accounts, PIN numbers, and other sensitive financial information related to the user 301 or to an entity associated with the identification data 302.

In some implementations, the analytic server 312 deletes the sensitive information after executing its analytics task or tasks as determined by the specific request by the data controller. The analytic server 312 passes requested content and the transient token 313, e.g., the result of the analytic operation, to the request server 304. A transient token matcher 320 executed on the request server 304 matches the transient token back to the identification data. The request server 304 is able to match the transient token back to the particular user because the transient token generator 318 is also executed on the request server 304, so the transient token matcher 320 has access to the same transient token store or generation method as the transient token generator 318. The request server 304 can pass the result, e.g., identification data and requested content 317 of the analytic server 312 to the application server (e.g., the data controller). The application server 303 can deliver the relevant requested content 328, e.g., an advertisement, back to the user 301 without directly processing, storing, or analyzing the sensitive information that it has collected over time in relation to the user 301.

In some implementations, the transient token is returned to the request server for reuse. The transient token, stored in the transient token store 305, can be assigned to other received identification data associated with a new user. The reuse of the transient token creates an ambiguous mapping over time between a particular request and a particular user, enhancing the privacy in relation to sensitive information related to the particular user.

In some implementations, multiple processes executed by distinct servers illustrated in relation to FIG. 3 (e.g., the transient token generator, the transient token matcher, the token generator, and the requested content generator) can be implemented on a single server or fewer servers than what is illustrated in FIG. 3. For example, the application server 303 can include the functionality of the request server 304, the de-identification server 314, the de-identified data server 316, and the analytic server 312. The level of security and mitigation against a potential data breach on behalf of a bad actor depends on the access levels assigned to each process. For this example, a firewall between the token generator 322 and operations executed by the application server 303 could provide increased security similar to a scenario in which a separate server operates the corresponding process.

Figure 4:
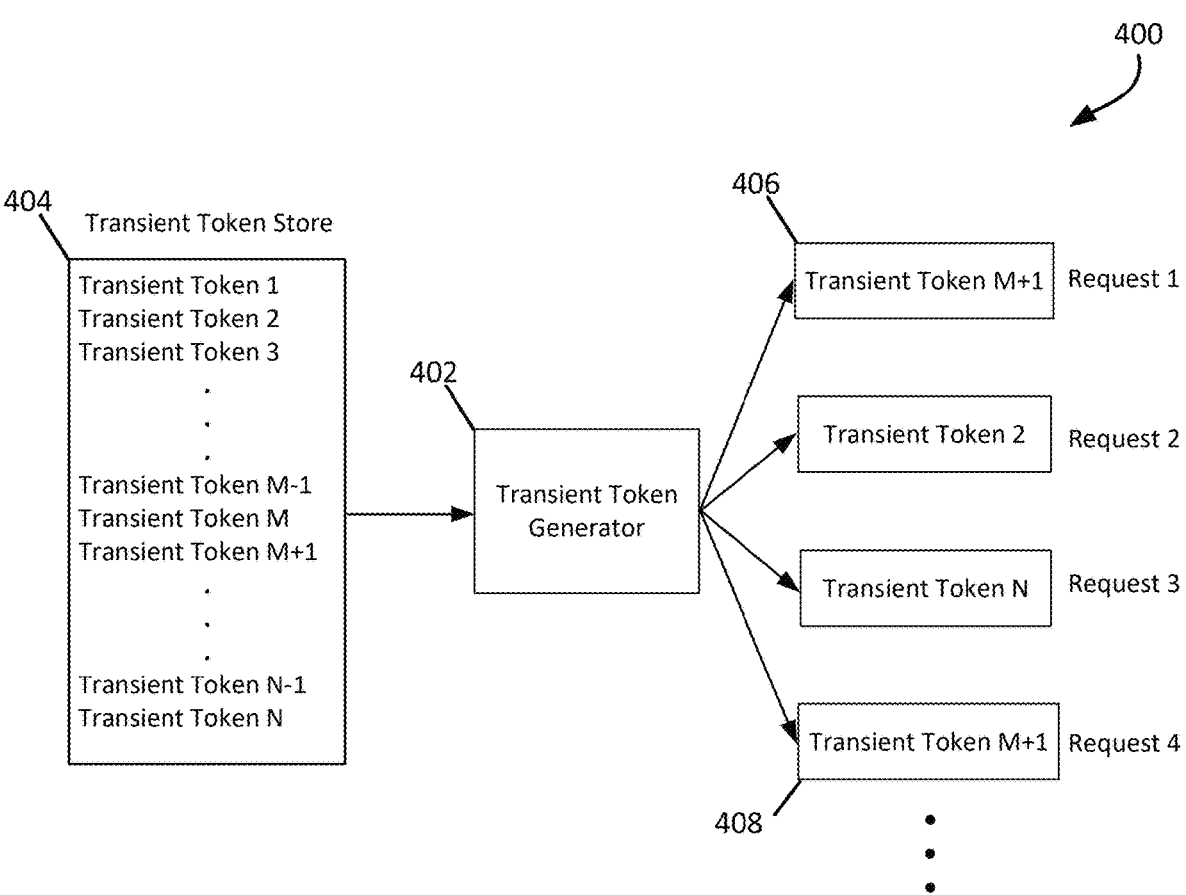
FIG. 4 is a data flow diagram showing a transient token generator that can generate a transient token from a transient token store.

Referring to FIG. 4, a data flow diagram 400 is presented showing a transient token generator 402 that can generate a transient token (e.g., transient token 406) from a transient token store 404. In this arrangement, the transient token store 404 includes a finite set of transient tokens, e.g., transient tokens 1-N. The method of generating a transient token can include selecting a transient token from the transient token store 404 based on a random distribution or from any other probability distribution. In some implementations, the use of the transient token rather than a fixed token uniquely associated with a particular user, ensures that no party other than a data processor charged with securely storing and maintaining sensitive information can be reliably associated with a specific user.

For example, the transient token generator 402 can generate a transient token for each request from an application server (e.g., application server 303). In some implementations, the transient token generator 402 selects a transient token from a transient token store 404. The method for selecting the transient token can include selecting a token from a random distribution, from a non-random probability distribution, or any other method. Each request is associated with a transient token, as illustrated in the figure.

To illustrate the use of the transient token generator 402 illustrated in the figure, consider a system that delivers an advertisement to two users based on their respective sensitive information stored in a de-identified data server (e.g., the de-identified data server 214) at two distinct times. A corresponding request from the application server (e.g., application server 303) initiates the delivery of each advertisement that follows the transfer of information described in relation to FIG. 3. If the transient token generator 402 selects the same transient token for both requests, the sensitive information returned to the application server cannot be reliably assigned to a particular user by matching the transient token to the corresponding user.

As illustrated in the previous example, the transient token store 404 with a finite number of transient tokens can mitigate risk corresponding to actions of a bad actor that has access to one or more servers that participate in the transfer and processing of sensitive information. However, in some cases, a bad actor could take additional actions to circumvent the de-identification process. For example, the bad actor can compare timestamps in log files stored in the one or more servers that correspond to the requests sent by the application server, request server, or any other resource in the system with the returned values from the analytic server or de-identified data server. The comparison of timestamps can be used to determine a correlation between the returned value, e.g., sensitive information, and a corresponding user identity. To mitigate this type of action performed by a bad actor, the system can perform additional security steps. For example, one or more techniques can be used to further obfuscate the correlation between requests and returned results from the data processor. For example, the user can implement decoy requests into the system with the same timestamps and multiple identification data and transient tokens to decrease the probability of a bad actor determining a user identity and a correlated set of sensitive information. As another example, the data transfer protocol can require logging to be turned off while the data is requested from the data processor and received by the data processor. As another example, the system can implement a random temporal delay to the returned result from the data processor to decrease the probability of a bad actor being able to use timestamps to match an identity with a set of sensitive information. These example mitigation techniques, along with others, can operate individually or in tandem to increase the security against bad actors that have access to a subset or all of the system's log files and server data.

In the case of a bad actor (e.g., a rogue employee or nefarious third party) in possession of the particular transient token along with the corresponding set of sensitive information or analysis of sensitive information, the bad actor is not able to reliably assign the sensitive information or analysis to a particular user because the transient token may be assigned to more than one requests corresponding to more than on user. In the case of the bad actor gaining access to the de-identified data server, the de-identified data server is indexed by the token generated by the de-identification server, not the transient token. The bad actor is not able to assign a relationship between a set of sensitive information or a transient token to a particular user (e.g., to the first user or the second user). For example, the transient token generator 402 generates transient token M+1 406 associated with request 1 and transient token M+1 408 associated with request 4, where request 1 and request 4 are issued at two different times. In some implementations, the transient token generator 402 only selects a transient token from the transient token store 404 that is not currently in use.

Figure 5A:
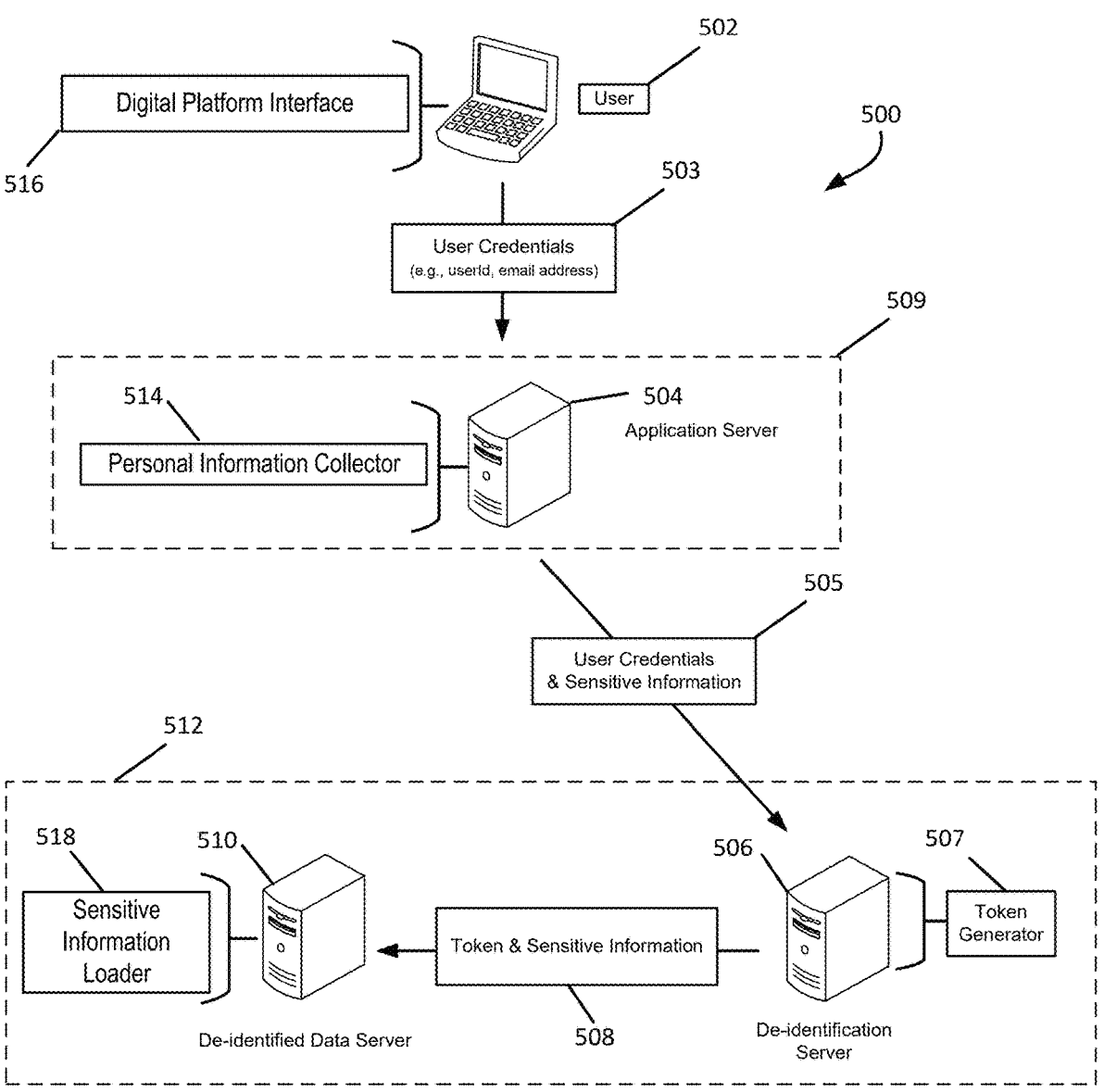
FIG. 5a illustrates a system diagram of a data controller instructing a data processor to store sensitive information of a user on a de-identified data server.

In relation to FIG. 5a, a system diagram 500 graphically illustrates a data controller 509 (e.g., social media website or application) instructing a data processor 512 to store sensitive information of a user 502 on a de-identified data server 510. In this example, the data controller 509 operates an application server 504 that serves content and other aspects of a digital platform that operates a digital platform interface 516 that is made available to the user 502. For example, as described in relation to FIG. 1, when a user 502 performs actions while interacting with the digital platform interface 516, the user leaves a trail of sensitive information that can be collected, stored, and used by the data controller to deliver a personalized experience. For example, actions performed by the user may include watching a video, interacting with another user, clicking a link, or sharing a piece of content on the digital platform. As described in relation to FIG. 2, the data controller 509 can opt to use one or more independent data processors (e.g., data processor 512) to store, manage, and analyze the sensitive information.

The application server 504 managed by the data controller 509 can receive identification data 503 from the user 502. The application server 504 also operates a sensitive information collector 514 that collects sensitive information related to how the user 502 interacts with the digital platform and sends the identification data and sensitive information 505 to the de-identification server 506. A token generator 507 implemented on the de-identification server 506 generates a unique token, where the process of generating the unique token is the same as the process described in relation to FIG. 3.

Figure 5B:
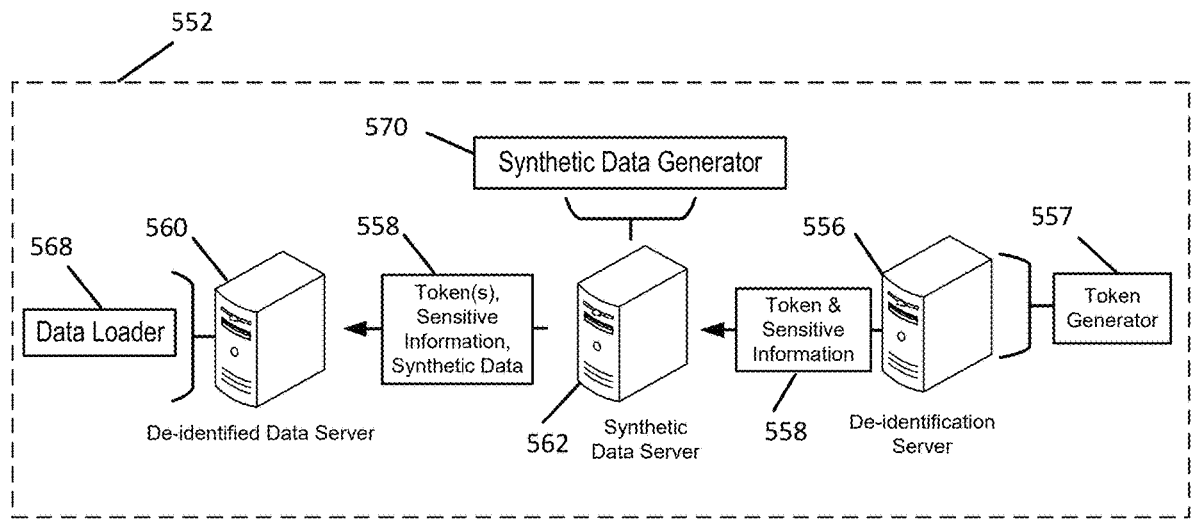
FIG. 5b illustrates a system diagram of a data processor that stores sensitive information of a user and synthetic user data on a de-identified data server.

The de-identification server 506 can pass the unique token and sensitive information 508 to the de-identified data server 510, where a sensitive information loader 518 loads sensitive information in a de-identified database that is indexed by unique tokens generated by the token generator 507. In relation to FIG. 5b, a system diagram 550 graphically illustrates a data processor 552 that stores sensitive information of a user (e.g., user 502) on a de-identified data server 560. In addition, a synthetic data generator 570 generates synthetic user data and associated sensitive information to store in the de-identified data server 560 alongside the sensitive information that it receives from a de-identification server 556. The system illustrated in FIG. 5b corresponds to an alternative approach to the system described in FIG. 5a that describes the population of a de-identified data server 510 with sensitive information that is indexed by a unique token generated by the token generator 507.

The de-identification server 556 transmits a unique token and sensitive information 558 to the synthetic data server 562. In some implementations, the synthetic data generator 570 operates on the synthetic data server 562 and generates synthetic tokens using the same or similar technique as the de-identification server 556 and associated sensitive information of the same format as the sensitive information received by the de-identification server 556 that corresponds to a user (e.g., user 502). In some implementations, the synthetic user data and associated sensitive information is generated by an artificial intelligence (AI) system (e.g., a generative AI system that is trained on existing user data and sensitive information to mimic the type of sensitive information collected by a particular application server, e.g., the application server 504). In some implementations, the synthetic data generator 570 generates one instance of synthetic data (e.g., synthetic data corresponding to one synthetic user) for each instance of sensitive information it receives from the de-identification server 556. In some other implementations, the synthetic data generator 570 generates multiple instances of synthetic data for each instance of sensitive information it receives from the de-identification server 556.

The synthetic data server 562 transmits one or more instances of unique generated tokens, sensitive information and synthetic data corresponding to a real user (e.g., user 502) and each synthetic user 558 that is generated by the synthetic data generator 570 to the de-identified data server 560. A data loader 568 that operates on the de-identified data server 560 stores each data item corresponding to the real user and each synthetic user. In other words, the de-identified data server 560 includes data items that correspond to real users (e.g., user 502) and synthetic users (e.g., the one or more users generated by the synthetic data generator 570).

Synthetic data generated by the synthetic data server 562 represent database entries that are indistinguishable from data corresponding to real users of a digital platform. The inclusion of synthetic data enhances the security of data stored on the de-identified data server 560 in an event of a data breach, or a bad actor gaining access to the de-identified database. A bad actor will be unable to determine which entries of the de-identified data correspond to real users of a particular digital platform and which entries correspond to synthetically generated users.

Figure 6:
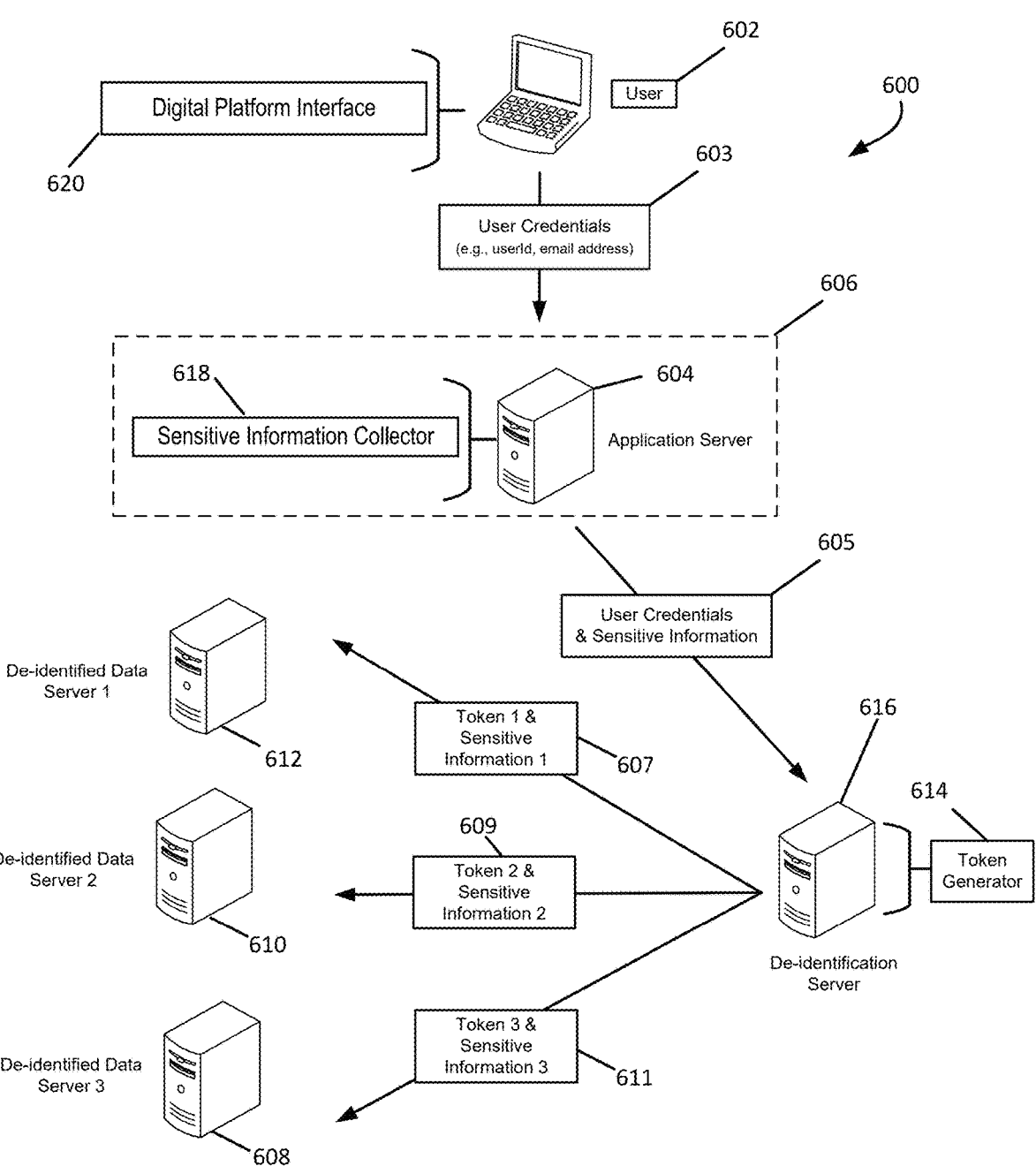
FIG. 6 illustrates a system diagram that graphically illustrates a data controller instructing a data processor to store sensitive information of a user on more than one de-identified data servers.

In relation to FIG. 6, a system diagram 600 graphically illustrates a data controller 606 (e.g., social media website or application) instructing a data processor to store sensitive information of a user 602 on more than one de-identified data servers 608, 610, 612. In this example, the data controller 606 operates an application server 604 that serves content and other aspects of a digital platform to the user 602. A sensitive information collector 618 operates on the application server 604 and collects data about the user 602. For example, similar to the user 102 of FIG. 1, when the user 602 performs actions while interacting with a digital platform interface 620 of the digital platform, the user leaves a trail of sensitive information that can be collected, stored, and used by the data controller to deliver a personalized experience. For example, actions performed by the user may include watching a video, interacting with another user, clicking a link, or sharing a piece of content on the digital platform. Similar to the data controller 206 of FIG. 2, the data controller 606 can opt to use one or more independent data processors to store, manage, and analyze the sensitive information.

An application server 604 managed by the data controller can receive identification data 603 from the user 602. The application server 604 also collects sensitive information related to how the user 602 interacts with the digital platform and sends the identification data and sensitive information 605 to the de-identification server 616. A token generator 614 implemented on the de-identification server 616 generates a unique token for each de-identified data server 608, 610, and 612. In some implementations, the token generator 614 generates a single unique token that indexes the database on the de-identified data servers 608, 610, and 612. The process of generating the unique token is the similar to the process described in relation to FIG. 3, where the personally identifiable information is stripped from the sensitive information and the identification data. In some implementations, the token generator 614 generates tokens by implementing a hashing function, cryptographic key generation, token replacement, or any combination thereof, for example, as described in relation to FIG. 3.

The de-identification server 616 can pass the one or more unique tokens and sensitive information 607, 609, and 611 to the de-identified data servers 608, 610, and 612 which can store the sensitive information in more than one de-identified databases that are indexed by the one or more unique tokens generated by the token generator 614 on the de-identification server 616.

In some implementations, different aspects of the sensitive information are stored on a particular de-identified data server. For example, click stream data are stored on the de-identified data server 608, video analytics data are stored on the de-identified data server 610, and social interactions on the digital platform are stored on the de-identified data server 612. In many cases, the structure and velocity of data from various sources varies greatly, and one or more specialized de-identified data server can be optimized to index and store a specific type of sensitive information. In addition, the inclusion of multiple unique tokens and multiple de-identified databases decreases the probability of a complete data breach where a bad actor has access to an entire set of sensitive information associated with one or more users.

Figure 7:
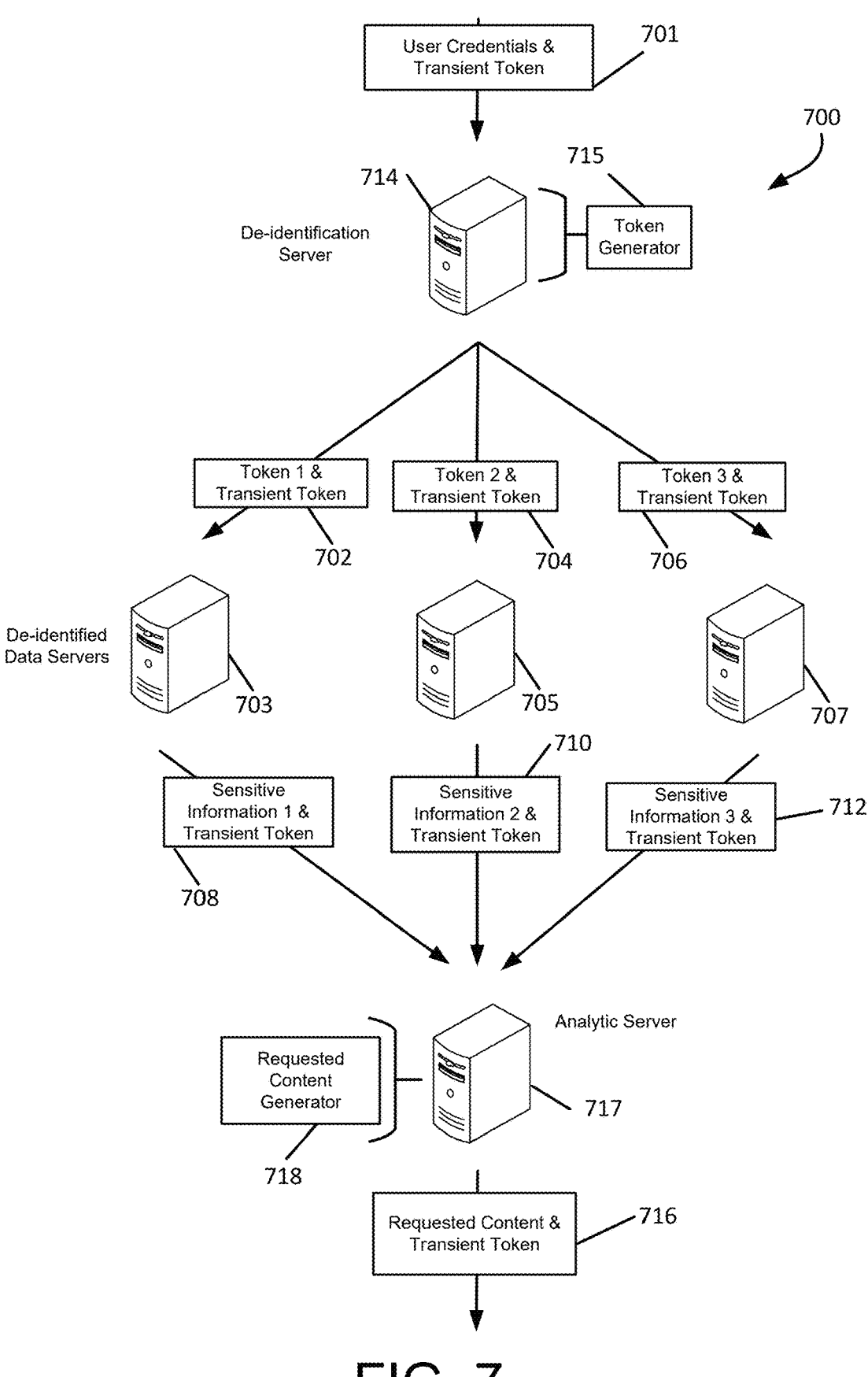
FIG. 7 illustrates a system diagram that graphically illustrates a process for generating requested content based on de-identified data related to a user that is stored in multiple de-identified data servers.

The system diagram 600 illustrates a process of storing de-identified data related to the user 602 in multiple de-identified data servers 608, 610, and 612. In relation to FIG. 7, a system diagram 700 graphically illustrates a process for generating requested content based on de-identified data related to a user (e.g., user 602) that is stored in multiple de-identified data servers (e.g., de-identified data servers 608, 610, and 612). A token generator 715 generates a unique token from identification data 701, where the token generator 715 is a similar or identical token generator (e.g., token generator 614) used to populate one or more de-identified data servers (e.g., de-identified data servers 608, 610, and 612) where sensitive information is stored. The token generator 715 generates one or more tokens that correspond to more than one de-identified data servers (e.g., de-identified data servers 703, 705, and 707).

The de-identification server 714 sends the one or more unique tokens and transient tokens 702, 704, and 706 to the more than one corresponding de-identified data servers 703, 705, and 707. The de-identified data servers 703, 705, and 707 match the unique tokens to the database of sensitive information and sends the one or more sets of sensitive information and transient tokens 708, 710, 712 to an analytic server 717.

In this implementation, a requested content generator 718 implemented on the analytic server 717 processes the sensitive information retrieved from the more than one de-identified data servers 703, 705, and 707 to produce requested content or another output derived from the sensitive information. The analytic server 717 sends the requested content and transient token 716 back to the request server, where the result is routed back to the user or requesting entity (e.g., the application server).

Referring to FIG. 8, a flow chart illustrates an example process 800 that includes receiving identification data from an application server, receiving corresponding de-identified sensitive information from a de-identification data server, and returning an analysis (e.g., requested content) corresponding to the identification data and the associated de-identified sensitive information. The process 800 can be performed by a system similar to system described in relation to the exemplary circumstances 300, which can include one or more computer systems. For example, the system can include the servers presented in FIG. 3 (e.g., the application server 303, the request server 304, the de-identification server 314, the de-identified data server 316, and the analytic server 312). In some arrangements, functionality may be distributed to more or less computational devices (e.g., servers). For example, operations of an application server (e.g., the application server 303) and a request server (e.g., the request server) can be executed by one computing device (e.g., one server) or distributed across multiple computing devices (e.g., three or more servers). In some examples, the operations executed by a de-identified data server (e.g., de-identified data server 316) and an analytic server (e.g., the analytic server 312) can be executed by one compute device or distributed across multiple computing devices. In some arrangements, functionality, executed operations can be performed using on-demand computational resources (e.g., cloud based computing) to attain and deliver requested content to users.

The system receives (802), at a request server, data representing identification data from an application server. The identification data corresponding to a particular user (e.g., user 102) in relation to a digital platform (e.g., digital platform 112).

The system assigns (804) a transient token to the received identification data and initiates transmission of the identification data and the assigned transient token to a de-identification server. In some implementations, the transient token is assigned with a transient token generator (e.g., transient token generator 402). The transient token generator can generate or select a transient token from a transient token store (e.g., transient token store 404) that includes a finite number of reusable transient tokens.

The system generates (806), at the de-identification server, a unique token from the identification data received from the request server, and initiates transmission of the generated unique token and the assigned transient token to a de-identified data server. In some implementations, the de-identification server (e.g., de-identification server 314) generates the unique token by implementing a hashing function, cryptographic key generation, token replacement, or any combination thereof, as described in relation to FIG. 3.

The system receives (808), at the de-identified data server, data representing sensitive information corresponding to the identification data based on matching the generated unique token and a token corresponding to the identification data of the sensitive information stored at the de-identified data server, and initiates transmission of the received sensitive information and the assigned transient token to an analytic server. In some implementations, the system receives data representing sensitive information corresponding to the identification data from multiple de-identified data servers, where a different type of sensitive information is stored on each de-identified data server.

The system initiates (810), at the analytic server, to the request server requested content attained from the received sensitive information and the transient token. In some implementations, the requested content is generated from the sensitive information received from the de-identified data server. In some implementations, the sensitive information received from the de-identified data server is deleted after the generating the associated requested content. In some implementations, the requested content is an analysis of the sensitive information, a relevant advertisement, a suggested action for a user to take in relation to a digital platform, or any other output derived from the sensitive information.

The system initiates (812), at the request server, to the application server the attained requested content based on the transient token being received at the request server. In some implementations, the request server matches the transient token and the requested content received from the analytic server to the transient token and identification data sent to the de-identified data server to generate a pair of items that includes the corresponding identification data and requested content associated with the identification data.

FIG. 9 illustrates a system 900 diagram that graphically illustrates generating nested tokens. The system 900 includes a de-identification server 902 that implements a token generator 918 and a token recombiner 920. Similar to FIG. 3, the de-identification server 902 receives identification data and a transient token 901 from a server (e.g., a request server similar to the request server 304). However, FIG. 9 illustrates a nested token generation process that is implemented by the system 900 after the de-identification server 902 receives the identification data and transient token 901. As such, only the token generation process is illustrated in FIG. 9.

Based on the identification data received by the de-identification server 902, the token generator 918 generates a token that irreversibly de-identifies a particular set of sensitive information (e.g., sensitive information present in the received identification data). The de-identification server 902 transmits the generated token and the received transient token (token 1 and transient token 904) to a de-identified data server 906. The de-identified data server 908 implements a token matcher 908 that operates similarly to the token matcher 324 of FIG. 3 by matching a received token with one or more tokens stored as indices in the de-identified data server 906. In contrast to the de-identified data server 324 and the de-identified data servers illustrated in FIGS. 5*a*-*b* and FIGS. 6-7, the de-identified data server 906 stores random numbers indexed by the generated tokens rather than sensitive information about particular users.

The de-identified data server 906 transmits one or more matched random numbers and the transient token (random number and transient token 910) to the de-identification server 902. Similar to the de-identified data server 324, the de-identified data server 906 deletes the generated token (e.g., the token of the token 1 and transient token 904) that is generated based on the received identification data.

The de-identification server 902 processes the received random number with the token recombiner 920 to generate a second token. The second token is based on a recombination of the random number with either the identification data, or other data stored on the de-identification server 902. In some implementations, the second token is not related to the received identification data as it is generated based on a random number received from the de-identified data server 906, in which the received random number is stored in the de-identified data server 906 at a data storage location correlated with the token that was generated based on the received identification data. Linkage to the identification data is absent after the random number is retrieved from the de-identified data server 906.

The de-identification server 902 transmits the second token and the transient token (token 2 and transient token 912) to a de-identified data server 916 that implements a token matcher 914. The token matcher matches the received second token to tokens stored in the de-identified data server

916, in which the tokens index the data base. In the case of the de-identified data server 916, the data stored in the indexed fields relate to sensitive information of individuals. As such, the data stored in the de-identified data server 916 is similar to the data stored in the de-identified data server 324 of FIG. 3. However, the tokens that index the de-identified data server 324 are generated based on received identification data, whereas the tokens that index the de-identified data server 916 are based on a random number received from the de-identified data server 906.

In some implementations, the de-identified data server 906 and the de-identified server 916 are implemented as physically distinct data servers. The physical separation allows for further separation of the stored sensitive information and tokens generated based on identification data. The further separation increases the security of the system, as the tokens that index the de-identification data server 916 are not related to the identification data, and only by accessing data on both the de-identified data server 906 and the de-identified data server 916 can a bad actor potentially match identification data with sensitive information.

The de-identified data server 916 retrieves sensitive information based on the received second token and passes the sensitive information and transient token 922 to an analytic server 922 to generate requested content by implementing a requested content generator 924, similar to the operations described in relation to the system 300 of FIG. 3.

In some implementations, additional de-identified data servers that store random numbers can be included in the system 900 to increase a degree of separation between data servers that store tokens generated based on identification data and data servers that store tokens based on random numbers.

Figure 10:
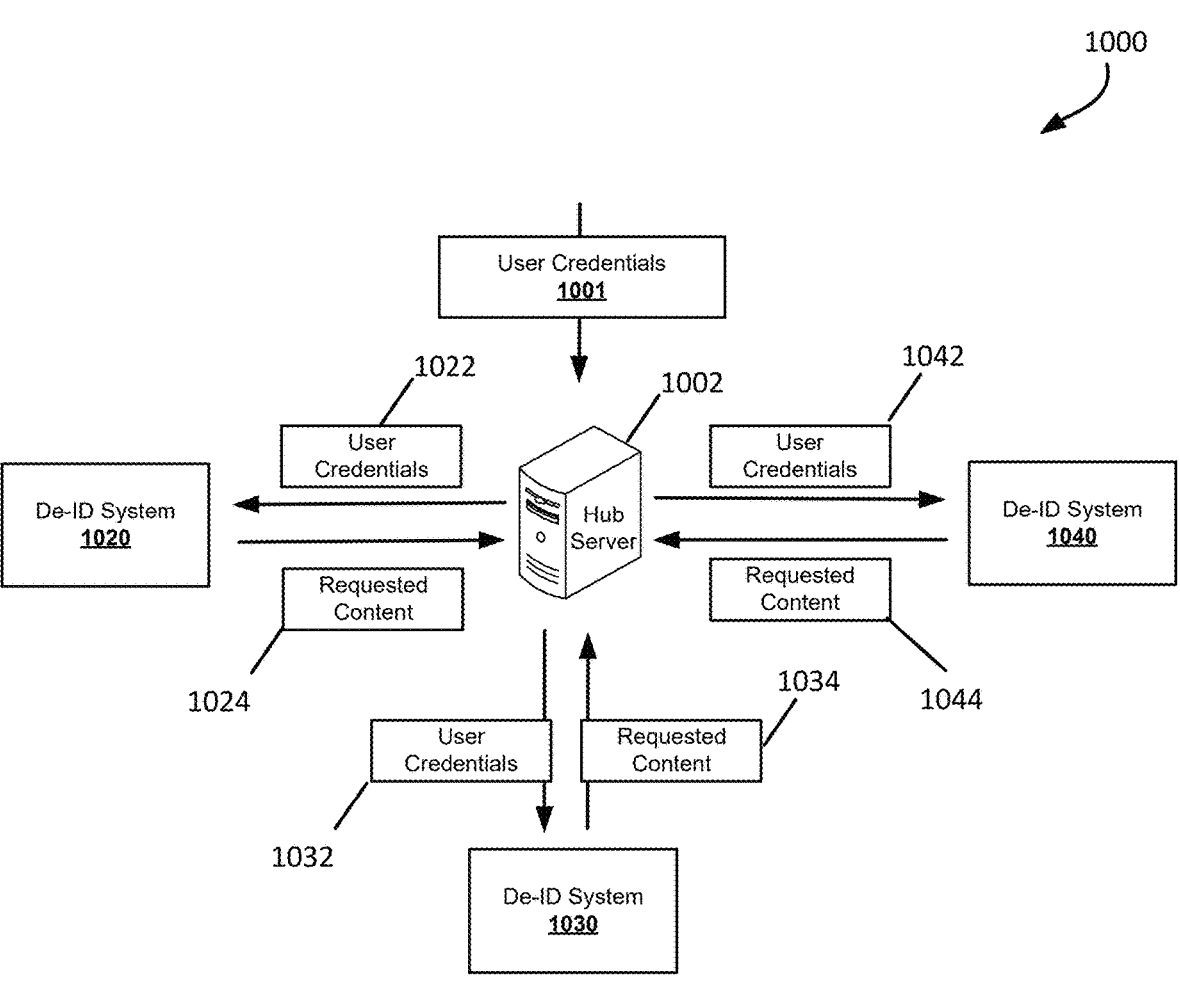
FIG. 10 illustrates a system diagram that graphically illustrates linear distancing of multiple de-identification systems.

FIG. 10 illustrates a system 1000 that graphically illustrates linear distancing of multiple de-identification systems. The system 1000 includes a hub server 1002 that receives identification data 1001 (e.g., via an application server similar to the application server 303 of FIG. 3) and transmits copies of the identification data 1001 to three separate de-identification systems.

The hub server 1002 transmits identification data 1022 to a de-identification system 1020, identification data 1032 to de-identification system 1030, and identification data 1042 to de-identification system 1040, in which each of the identification data 1022, 1032, and 1042 are copies of the identification data 1001. Each de-identification system 1020, 1030, and 1040 have similar components. For example, each de-identification system 1020, 1030, and 1040 can generate transient tokens and unique tokens based on identification data on a de-identification server (e.g., via a token generator similar to the token generator 322 of FIG. 3). Furthermore, the systems 1020, 1030, and 1040 can include de-identified data servers (e.g., similar to the de-identified data server 316 that implements the token matcher 324) and analytic servers (e.g., similar to the analytic server 312 that implements the requested content generator 326) to generate and return requested content.

The de-identification system 1020 returns requested content 1024 to the hub server 1002, the de-identification system 1030 returns requested content 1034 to the hub server 1002, and the de-identification system 1040 returns requested content 1044 to the hub server 1002. In some implementations, the hub server 1002 combines the requested content received from each de-identification according to one or more rules-based procedures. For example, the hub server 1002 can combine the received requested content using an RSA-like keystore that would temporarily provide keys used to recombine the requested content. As another example, the hub server 1002 can generate and transmit multiple transient tokens to each de-identification system, in which the generated transient tokens are used to recombine the received the data from each de-identification system.

In some implementations, each de-identification system 1020, 1030, and 1040 implement different de-identification methods. As such, the different de-identification methods generate different tokens based on the same identification data. Similarly, each de-identification system 1020, 1030, and 1040 can implement de-identified data servers that store different data related to individuals with tokens that are generated based on different de-identification methods. A bad actor that gains access to a method of generating a token for a particular de-identification system (e.g., the de-identification system 1020) does not have access to data stored in a different de-identification system (e.g., the de-identification system 1030) because the associated databases are indexed with tokens based on different de-identification methods.

In some implementations, a first de-identification system (e.g., the de-identification system 1020) includes a de-identified data server that stores a first type of data (e.g., identities of individuals) and a second de-identification system (e.g., the de-identification system 1030) includes a de-identified data server that stores a second type of data (e.g., account numbers). In this case, a system can implement a transaction that requires an account number of an individual without accessing related identity data of the individual.

An implementation that includes multiple, physically distinct de-identification systems that each implement different token generation procedures and store different data fields increases the security of the described system by introducing an increased level of obscurity to protect against bad actors gaining access to sensitive user data.

FIG. 11 is a flow chart that illustrates an example process 1100 implemented by a system similar to the system 900 described in relation to FIG. 9. The system can include one or more computer systems. For example, the system can include the servers presented in FIG. 9 (e.g., the de-identification server 902, the first de-identified data server 906, the second de-identified data server 916, and the analytic server 922). In some arrangements, functionality may be distributed to more or less computational devices (e.g., servers). For example, operations of a de-identification server (e.g., the de-identification server 902) and a de-identified data server (e.g., the de-identified data server 908) can be executed by one computing device (e.g., one server) or distributed across multiple computing devices (e.g., three or more servers). In some examples, the operations executed by a de-identified data server (e.g., the second de-identified data server 916) and an analytic server (e.g., the analytic server 922) can be executed by one compute device or distributed across multiple computing devices. In some arrangements, functionality, executed operations can be performed using on-demand computational resources (e.g., cloud based computing) to attain and deliver requested content to users.

The system receives (1102), at a first de-identified data server, data representing a random number based on matching the generated unique token and a token corresponding to the identification data at the first de-identified data server, and initiates transmission of the received random number and the assigned transient token to the de-identification server.

In some implementations, the first de-identified data server stores pre-generated random numbers that are linked to particular identification data.

The system generates (1104), at the de-identification server, a second unique token from the received random number received from the first de-identified data server, and initiates transmission of the generated second unique token and the assigned transient token to a second de-identified data server.

In some implementations, the first de-identified data server is physical separate from the second de-identified data server. In this case, a bad actor would need to compromise both servers to gain access to the sensitive information stored in the second de-identified data server.

The system receives (1106), at the second de-identified data server, data representing sensitive information corresponding to the identification data based on matching the generated second unique token and a token stored at the second de-identified data server, and initiates transmission of the received sensitive information and the assigned transient token to the analytic server.

FIG. 12 is a flow chart that illustrates an example process 1200 implemented by a system similar to the system 1000 described in relation to FIG. 10. The system can include one or more computer systems. For example, the system can include the servers presented in FIG. 10 (e.g., a de-identification server of the de-identification system 1020). In some arrangements, functionality may be distributed to more or less computational devices (e.g., servers). For example, operations of a de-identification server (e.g., the de-identification server of the de-identification system 1020) and a de-identified data server (e.g., a de-identified data server of the de-identification system 1020) can be executed by one computing device (e.g., one server) or distributed across multiple computing devices (e.g., three or more servers). In some arrangements, functionality, executed operations can be performed using on-demand computational resources (e.g., cloud based computing) to attain and deliver requested content to users.

The system receives (1202), at a second request server, data representing identification data from the application server. For example, system 300 includes the request server 304 that receives identification data 302 from the application server 303. In the present embodiment, the second request server receives the same identification data 302 from the application server 303. In some implementations, the request server 304 and the second request server initiate two "closed loop" systems that each include a respective de-identification server, de-identified data server, and analytic server. The closed loop system is referred to as the de-identification system 1020 in relation to the description of FIG. 10. In some implementations, the system can include a third request server, a fourth request server, etc., each request server part of a distinct de-identification system that results in a linear distancing between several de-identification systems. In some implementations, each de-identification system stores a different type of sensitive information (e.g., account numbers, website activity, sensitive information, etc.).

The system receives (1204), at the second request server, a second set of requested content attained from the sensitive information, in which the second set of requested content is different from the requested content received by the request server from the analytic server. For example, the second set of requested content (e.g., generated by an analytic server of a de-identification system that includes the second request server) is different from requested content generated from a de-identification system that includes the analytic server described in relation to the flow diagram of FIG. 8. As another example, in relation to FIG. 10, the requested content 1024 received from the de-identification system 1020 is different from the requested content 1034 received from the de-identification system 1030 because the sensitive information stored in each system is different.

The system generates (1206) a combined set of requested content that includes the requested content and the second set of requested content. In some implementations, the requested content received by the request server is different from the requested content received by the second request server and is thus combined to generate a single set of requested content.

The system initiates (1208) transmission of the combined set of requested content to the application server. The described embodiment in relation to FIG. 12 is related to a system that includes multiple copies of the closed loop of servers depicted in FIG. 3 (e.g., a request server, a de-identification server, a de-identified data server, and an analytic server), in which each copy implements a distinct process with potentially distinct de-identification methods, transient tokens, etc., and each copy storing different sensitive information related to individuals.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computing device implemented method comprising:
receiving, at a request server, identification data associated with an entity from an application server;
assigning a transient token to the received identification data and initiating transmission of the identification data and the assigned transient token to a de-identification server;
generating, at the de-identification server, a unique token from the identification data received from the request server, and initiating transmission of the generated unique token and the assigned transient token to a de-identified data server;
receiving, at the de-identified data server, data representing sensitive information corresponding to the identification data based on matching the generated unique token and a token corresponding to the identification data of the sensitive information stored at the de-identified data server, and initiating transmission of the received sensitive information and the assigned transient token to an analytic server;
initiating transmission, at the analytic server, to the request server the transient token and requested content attained from the received sensitive information, wherein the transient token is returned for reuse;
initiating transmission, at the request server, to the application server the attained requested content based on the transient token being received at the request server; and
upon receiving the transient token at the request server, provisioning the token to be assignable to subsequently received identification data associated with a different entity.

2. The computing device implemented method of claim 1, wherein the received sensitive information and the assigned transient token is transmitted to the analytic server absent the generated unique token.

3. The computing device implemented method of claim 1, wherein the de-identified data server deletes the generated unique token.

4. The computing device implemented method of claim 1, wherein the analytic server processes the received sensitive information to produce the attained requested content.

5. The computing device implemented method of claim 1, wherein the attained requested content comprises one or more links to information for an entity associated with the identification data.

6. The computing device implemented method of claim 1, wherein transmission of the attained requested content to the application server is initiated upon matching the transient token received from the analytic server to the transient token transmitted to the de-identification server.

7. The computing device implemented method of claim 1, wherein the de-identified data server stores sensitive information corresponding to one or more synthetic entities.

8. The computing device implemented method of claim 1, further comprising:
receiving, at another request server, data representing identification data from the application server;
receiving, at the other request server, an additional set of requested content attained from sensitive information, wherein the additional set of requested content is different from the requested content received by the request server from the analytic server;
generating a combined set of requested content comprising the requested content and the additional requested content; and
initiating transmission of the combined set of requested content to the application server.

9. The computing device implemented method of claim 1, further comprising deleting, by the analytics server, the sensitive information upon generating the requested content, wherein the requested content comprises an analysis of the sensitive information, and wherein the analysis does not include personally identifiable information related to the entity.

10. A system comprising:
a request server for receiving data representing identification data from an application server and assigning a transient token to the received identification data and initiating transmission of the identification data and the assigned transient token;
a de-identification server for receiving the identification data and the assigned transient token from the request server and generating a unique token from the identification data received from the request server, and initiating transmission of the generated unique token and the assigned transient token;
a de-identified data server for receiving the generated unique token and the assigned transient token from the de-identification server and receiving data representing sensitive information corresponding to the identification data based on matching the generated unique token and a token corresponding to the identification data of the sensitive information stored at the de-identified data server, and initiating transmission of the received sensitive information and the assigned transient token;
an analytic server for receiving the sensitive information and the assigned transient token from the de-identified data server and initiating transmission to the request server, the transient token and requested content attained from the received sensitive information, wherein the transient token is returned for reuse, the request server initiating transmission to the application server the attained requested content based on the transient token being received at the request server, wherein upon receiving the attained requested content, the transient token is assignable to other received identification data associated with a different entity.

11. The system of claim 10, wherein the received sensitive information and the assigned transient token is transmitted to the analytic server absent the generated unique token.

12. The system of claim 10, wherein the de-identified data server deletes the generated unique token.

13. The system of claim 10, wherein the analytic server processes the received sensitive information to produce the attained requested content.

14. The system of claim 10, wherein the attained requested content comprises one or more links to information for an entity associated with the identification data.

15. The system of claim 10, wherein transmission of the attained requested content to the application server is initiated upon matching the transient token received from the analytic server to the transient token transmitted to the de-identification server.

16. The system of claim 10, wherein the de-identified data server stores sensitive information corresponding to one or more synthetic entities.

17. The system of claim 10, further comprising:
another request server for (i) receiving data representing the identification data from the application server, (ii) receiving an additional set of requested content attained from sensitive information, wherein the additional set of requested content is different from the requested content received by the request server from the analytic server, (iii) generating a combined set of requested content comprising the requested content and the additional set of requested content, and (iv) initiating transmission of the combined set of requested content to the application server.

18. The system of claim 10, wherein the analytics server is configured to delete the sensitive information upon generating the requested content, wherein the requested content comprises an analysis of the sensitive information, and wherein the analysis does not include personally identifiable information related to the entity.

19. One or more computer readable storage devices storing instructions that are executable by a processing device, and upon such execution cause the processing device to perform operations comprising:
receiving, at a request server, identification data from an application server;
assigning a transient token to the received identification data and initiating transmission of the identification data and the assigned transient token to a de-identification server;
generating, at the de-identification server, a unique token from the identification data received from the request server, and initiating transmission of the generated unique token and the assigned transient token to a de-identified data server;
receiving, at the de-identified data server, data representing sensitive information corresponding to the identification data based on matching the generated unique token and a token corresponding to the identification data of the sensitive information stored at the de-identified data server, and initiating transmission of the received sensitive information and the assigned transient token to an analytic server;
initiating transmission, at the analytic server, to the request server the transient token and requested content attained from the received sensitive information, wherein the transient token is returned for reuse;
initiating transmission, at the request server, to the application server the attained requested content based on the transient token being received at the request server; and
upon receiving the transient token at the request server, provisioning the token to be assignable to subsequently received identification data associated with a different entity.

20. The computer readable storage devices of claim 19, wherein the received sensitive information and the assigned transient token is transmitted to the analytic server absent the generated unique token.

21. The computer readable storage devices of claim 19, wherein the de-identified data server deletes the generated unique token.

22. The computer readable storage devices of claim 19, wherein the analytic server processes the received sensitive information to produce the attained requested content.

23. The computer readable storage devices of claim 19, wherein the attained requested content comprises one or more links to information for an entity associated with the identification data.

24. The computer readable storage devices of claim 19, wherein transmission of the attained requested content to the application server is initiated upon matching the transient token received from the analytic server to the transient token transmitted to the de-identification server.

25. The computer readable storage devices of claim 19, wherein the de-identified data server stores sensitive information corresponding to one or more synthetic entities.

26. The computer readable storage devices of claim 19, further comprising:
receiving, at another request server, data representing identification data from the application server;
receiving, at the other request server, an additional set of requested content attained from sensitive information, wherein the additional set of requested content is different from the requested content received by the request server from the analytic server;
generating a combined set of requested content comprising the requested content and the additional set of requested content; and
initiating transmission of the combined set of requested content to the application server.

27. The computer readable storage devices of claim 19, the operations further comprising deleting, by the analytics server, the sensitive information upon generating the requested content, wherein the requested content comprises an analysis of the sensitive information, and wherein the analysis does not include personally identifiable information related to the entity.

* * * * *